United States Patent [19]

McIntyre et al.

[11] Patent Number: 5,245,702
[45] Date of Patent: Sep. 14, 1993

[54] METHOD AND APPARATUS FOR PROVIDING SHARED OFF-SCREEN MEMORY

[75] Inventors: Bruce McIntyre, Cupertino; Curtis Priem, Fremont; Robert Rocchetti, Cupertino, all of Calif.

[73] Assignee: Sun Microsystems, Inc., Mountain View, Calif.

[21] Appl. No.: 726,304

[22] Filed: Jul. 5, 1991

[51] Int. Cl.$^5$ .............................................. G06F 15/20
[52] U.S. Cl. ................................. 395/164; 395/157; 395/163; 345/119
[58] Field of Search ................... 395/164, 163, 157; 340/799

[56] References Cited

U.S. PATENT DOCUMENTS

| | | | |
|---|---|---|---|
| 4,047,243 | 9/1977 | Dijkstra | 364/DIG. 1 |
| 4,903,218 | 2/1990 | Longo et al. | 395/163 |
| 4,945,499 | 7/1990 | Asari et al. | 395/164 |
| 5,043,923 | 8/1991 | Joy et al. | 395/164 |
| 5,127,098 | 6/1992 | Rosenthal et al. | 364/DIG. 1 |
| 5,159,665 | 10/1992 | Priem et al. | 395/134 |

*Primary Examiner*—Dale M. Shaw
*Assistant Examiner*—Kee M. Tung
*Attorney, Agent, or Firm*—Blakely Sokoloff Taylor & Zafman

[57] ABSTRACT

A method for allowing direct graphics access to backup storage areas in frame buffer memory used for retained windows and controlled by a graphics accelerator which includes the steps of establishing a shared memory file in system memory for the backup storage area indicating that the retained windows area initially exists in excess frame buffer memory, the shared memory file having storage to indicate the use of the shared area by a process; generating a page fault whenever access to the graphics accelerator is attempted and the state of another process is stored on the graphics accelerator; and calling a device driver in response to the page fault to switch the context stored on the graphics accelerator to that of the process attempting the access.

8 Claims, 5 Drawing Sheets

```
FROM FIGURE 3b
```

100 — THE APPLICATION PROGRAM OPENS AND MAPS THE SECOND SHARED MEMORY FILE INCLUDING ALL ITS PAGES. APPLICATION PROGRAM USES UNIQUE WINDOW IDENTIFIER FROM FIRST SHARED FILE STATUS PAGE TO CONSTRUCT FILE NAME. APPLICATION PROGRAM USES INFORMATION IN SECOND STATUS PAGE TO DETERMINE SIZE OF SHARED MEMORY PIXEL AREA.

IF WINDOW SYSTEM / IF APPLICATION

110 — WINDOWS SYSTEM WRITES TO SHARED MEMORY LOCK PAGE TO LOCK OUT APPLICATION PROGRAM WHENEVER IT NEEDS TO UPDATE STATUS INFORMATION FOR EITHER THE VISIBLE OR RETAINED PORTION OF THE WINDOW AND WHILE IT IS RENDERING TO EITHER PORTION OF THE WINDOW. IF THE APPLICATION PROGRAM CURRENTLY HAS THE LOCK, THE VIRTUAL MEMORY SYSTEM BLOCKS ACCESS OF THE LOCK PAGE TO THE WINDOW SYSTEM UNTIL THE APPLICATION PROGRAM GIVES UP THE LOCK OR TIMES OUT. THERE IS NO TIME LIMIT ON THE WINDOW SYSTEM'S USE OF THE LOCK.

120 — IF WINDOW SYSTEM ACCESSES GRAPHICS ACCELERATOR REGISTERS DURING AN UPDATE, ITS FIRST ACCESS CAUSES THE VIRTUAL MEMORY SYSTEM TO PERFORM A CONTEXT SWITCH OF THE REGISTERS IF NECESSARY.

130 — EACH TIME APPLICATION PROGRAM WISHES TO UPDATE OUTPUT TO THE WINDOW, IT FIRST WRITES TO SHARED MEMORY LOCK PAGE OF THE VISIBLE WINDOW MEMORY FILE. IF THE WINDOW SYSTEM HAS THE LOCK, THE VIRTUAL MEMORY SYSTEM BLOCKS ACCESS OF THE LOCK PAGE TO THE APPLICATION PROGRAM UNTIL THE WINDOW SYSTEM GIVES UP THE LOCK. ONCE THE APPLICATION PROGRAM OBTAINS THE LOCK, IT KNOWS THE STATUS INFORMATION FOR BOTH VISIBLE AND RETAINED PORTIONS OF THE WINDOW IS VALID AND COMPLETE AND USES THIS INFORMATION TO UPDATE BOTH PORTIONS OF THE WINDOW BEFORE GIVING UP THE LOCK.

140 — IF APPLICATION PROGRAM ACCESSES GRAPHICS ACCELERATOR REGISTERS DURING AN OUTPUT UPDATE, ITS FIRST ACCESS CAUSES THE VIRTUAL MEMORY SYSTEM TO PERFORM A CONTEXT SWITCH OF THE REGISTERS IF NECESSARY.

*Figure 3c*

METHOD AND APPARATUS FOR PROVIDING SHARED OFF-SCREEN MEMORY

BACKGROUND OF THE INVENTION

1. Field Of The Invention

This invention relates to display memory and, more particularly, to methods and apparatus for utilizing display memory to store off-screen pixel data to which direct graphics access is allowed.

2. History Of The Prior Art

In its simplest form, a computer writes data from a single program to a frame buffer which stores the data so that it may be written to an output display. The data of this single program covers the entire output display. When it is desired to display more than one program at a time on an output display, it is necessary for the computer system to somehow provide different portions of the screen (windows) in which each program may be displayed, direct the information from each program to the correct window, and take care of the overlapping of different windows so that the correct portions of each are presented, among other things.

If all of these tasks are done by individual programs, then there must be a great deal of checking among programs to make sure that the different programs do not interfere with one another. This tends to slow the operation of the system, and allows poorly designed software to distort the operation of the system. For this reason, more advanced computer systems have designed window system programs which take over the entire operation of writing to the frame buffer for control of what is displayed. A window system controls the entire display. It receives requests to display information from the individual application programs, stores those requests in system memory, selects the windows in which different programs may be displayed, translates the requests furnished by the application programs and stored in main memory to text and graphics output to the frame buffer, controls the overlaps of windows, upon request stores the data in the covered portions of windows so that it may be recalled at a later time, and does all operations necessary for the display of a number of programs on a single output display device. This assures that programs operate correctly in presenting their outputs and relieves an application programmer of the necessity of writing many of the procedures for display purposes.

Windows are generally represented as varying sized rectangular pixel areas on the output display. When one window overlaps another, a portion of the pixels from the overlapped window are no longer visible on the output display. When the invisible portion of an overlapped window again becomes visible due to changes in the window overlap arrangements on the output display, the formerly invisible pixel area from this window must be repaired. Sometimes it is possible for the program sending output to this window to repair the newly exposed area. In other cases, usually due to the complexity of the repair, the program would prefer that the window system remember the pixels that previously appeared in this pixel area from its output stream and that the window system take care to retain and restore the pixels as necessary, leaving the program free to ignore any repair operations which might become necessary. Some window systems support this feature through a mechanism called retained windows. Application programs which wish not to be burdened with repairing damaged areas of their windows request this feature from the window system.

Even though window systems have been designed to do all of these things, there are some difficulties with using them. For example, there may be some kinds of graphics operations which the window system does not support. Additionally, a computer system running such a window system program does not operate as rapidly to display information as do individual programs which themselves write directly to the frame buffer. A window system program with its necessary overhead may be able to vary the output display only ten times per second while a live video display requires that it be displayed sixty times per second in order to describe action in a manner which does not appear to the viewer to be distorted.

In order to speed the overall graphics operation, various graphics accelerators have been designed which relieve the central processing unit of many of the graphics display functions and thereby speed the rendering of graphic information to the display. Some computer systems allow data from individual application programs to bypass the window system and be written directly to the graphics accelerators and thereby substantially speed the rendering of graphic images on an output display. Typically, very fast graphics programs will use this facility to speed rendering. However, the window system program is still used in a multitasking environment to control the assignment and manipulation of the windows areas on the display and to control the rendering of graphics images for the other application programs which do not require very fast rendering. Consequently, two individual processes, the window system controlling the placement and movement of the window and the application program providing the data for the window, must share the graphics accelerator hardware for windows to which the application program has direct graphics access.

If multiple processes running on a computer system want to share a piece of hardware that, in order to operate correctly, stores information regarding the state of the process being run (data defining the state of the process, generally referred to simply as "state"), each time a different process wants to use the particular hardware something has to change the state of the hardware. That is, the process currently being run must have its state saved so that the state can be restored in the hardware when the process is to be recommenced in order to continue the process from the point at which it halted. Additionally, the process to be run must have its state restored in the hardware so that the process will run correctly. This operation is generally referred to as saving and restoring state or context switching.

Traditionally, a process would request exclusive use of a particular piece of hardware and use it exclusively for some period of time. In order to obtain this exclusive use, the process would make a call to the operating system. The operating system would conduct a number of checks and ultimately probably accomplish the context switch. Such a call takes a great deal of time and distracts the central processing unit from other functions. When the computer is running a single application program, the time taken is not terribly important since such a call is not used often. However, for computer systems involved in multitasking a number of different application programs simultaneously, the traditional process of system calls from the application programs to accomplish context switching must be utilized quite often and causes a substantial slowing of system operation.

In systems using a plurality of processors (such as a central processor and a floating point processor) which normally require a large amount of context switching, the operating system has long been provided with scheduling facilities which eliminate the need for the calls by the processes to the system in order to accomplish a context switch and thereby reduce the time required. However, such automatic context switching mechanisms were typically not available for the use of other hardware in the system.

Where the processes require the transfer of very large amounts of data as in the simultaneous display of the results of multiple application programs in a plurality of windows on an output display, very extensive context switching is necessary. For example, a graphics accelerator stores state relating to individual application programs being simultaneously displayed in windows on an output display. This state describes, among other things, the position of an individual window, the color mode used by the application program, whether the results to be displayed by the program are being double buffered, and a number of other things. Similarly, the state necessary for the operation of the window system is stored in the graphics accelerator when that process is run.

Normally software in a multitasking environment must be written to either request the exclusive use of all hardware resources it may need for the entire time the process is running, or it must explicitly request the hardware each time it needs to use it. In order to permit maximum sharing of limited hardware resources, well written software generally limits the amount of time it spends holding exclusive access rights to shared hardware. However, since explicit access requests are usually time consuming, most software will place access requests at relatively top levels of code, not actually knowing what kind of accesses, if any, will actually be required. In a multitasking system, if each use of the central processing unit by a process fosters a request for access to the graphics accelerator, the myriad requests by different processes which are time sharing the central processing unit would cause constant context switching even though the graphics hardware were not always required. If each of these requests requires a call to the operating system, then the actual display of the multiple windows will slow drastically due only to the overhead of processing access requests. Even if a system call by an application program is only required for each actual use of the graphics accelerator by a different application program, the requirement is a great waste of time.

Recently, an arrangement for context switching has been devised by which a plurality of processes may utilize hardware devices in addition to the central processor and the math coprocessor without requiring system calls by the application programs. U. S. patent application Ser. No. 07/413,976, entitled *Method and Apparatus for the Context Switching of Devices*, filed Sep. 28, 1989, D. Rosenthal et al, and assigned to the assignee of the present invention, describes such a system. In accordance with the teaching of the invention, the request for the use of a hardware device by a process and the attendant context switching is moved from a system call into the virtual memory management portion of the system which consists of both hardware and efficient software support already built into and optimized within the operating system. The simple attempt by a process not running on a device to utilize the device triggers a page fault which is automatically handled by the virtual memory management portion of the system to accomplish the context switch. The memory management facilities are already set up to do the context switch efficiently.

Removing the explicit access requests from the application program dramatically reduces the amount of overhead involved in a context switch. The memory management unit calls a device driver for the specific piece of hardware. The device driver is set up to do the context switch as an automatic operation. In the preferred embodiment, if the process never actually accesses a particular hardware device, the context switch of the device never occurs. When used with a graphics accelerator, the process functions to reduce the context switching which takes place and to increase the speed of the context switching which does occur in presenting a plurality of application programs in multiple windows using the graphics accelerator hardware. This new invention has greatly accelerated the context switching necessary for direct graphics access support for multiple graphics application programs running simultaneously.

However, recently a new method has been developed for utilizing excess frame buffer memory to store off-screen data associated with the display. For example, it is often useful to store in off-screen memory a second representation of the data in a graphics window covered by a portion of another window. This second representation provides backup storage (typically referred to as a "retained window") for pixel data in a portion of a window covered by a portion of another window. This pixel data is kept so that it may be restored to the screen if the overlapping window is removed from the covering position. If this off-screen retained window can be stored locally in the display hardware, then the substantial time required to store the data in system memory is saved. Display systems which provide double buffering for application programs offer substantial amounts of unused frame buffer memory during periods in which double buffering is not used. Prior to the recent invention, the allocation of off-screen memory was too slow to allow display memory to be used for this purpose. U.S. patent application Ser. No. 716,671 entitled *METHOD FOR ALLOCATING OFF SCREEN DISPLAY MEMORY*, McIntyre et.al, filed Jun. 17, 1991, and assigned to the assignee of the present invention discloses in detail a method of making use of this off-screen display memory.

Typically, the window system controls the storage and updating of the retained window pixel data. However, where there is direct graphics access by the application program, the window system has no control over the pixel data and therefore cannot update the data in the currently invisible retained portion of the window to correspond to updates made by the application program to the visible portion of the window. Consequently, stale pixel data may be provided when the window is uncovered. In order to update a covered portion of a window without requiring a call to the application program, it is necessary that the application program using direct graphics access be able to write to the off-screen memory at the same time that it writes to the visible memory. This is especially true when the application has been written without the ability to remember and redraw old output. This dual access is not possible using the arrangement disclosed in the first above-mentioned patent application.

Not only is it useful for the application program to have direct graphics access to off-screen memory in the frame buffer, if double buffering is required for any application program being run on the display, then the off-screen frame buffer space must be provided for this double buffering. In such a case, any retained window or similar off-screen data stored in the excess space of the frame buffer (now being used for double buffering) must be removed to system memory. Consequently, the application program should also have direct graphics access to the retained portion of the window when the data is stored in system memory. And since the window system controls the moving of the off-screen data whether stored in the frame buffer or system memory, it must also have access to this memory. Since the retained window data may be stored in either system memory or off-screen frame buffer memory, both the application program and the window system must be able to deal with the retained window data whether in the frame buffer or the system memory. This requires not only a mechanism for shared access to the pixel data whether in off-screen or system memory but also a method to assure access synchronization and context switching of graphics hardware when in off-screen memory.

SUMMARY OF THE INVENTION

It is, therefore, an object of the present invention to eliminate the need for system calls to effect context switching for hardware used in the storage of off-screen data in frame buffer memory.

It is another object of the present invention to automate the context switching of state for off-screen data stored in the excess memory of a frame buffer.

It is an additional object of the present invention to automate the context switching of state for off-screen data whether stored in the excess memory of a frame buffer or in system memory.

These and other objects of the present invention are realized in a method for allowing direct graphics access by application programs to backup storage areas in frame buffer memory used for retained portions of windows and controlled by a graphics accelerator which comprises the steps of establishing a shared memory file in system memory for the backup storage area indicating that the retained portion of the window area initially exists in excess frame buffer memory, the shared memory file having storage to indicate the use of the shared area by a process; generating a page fault whenever access to the graphics accelerator is attempted while the state of another process is stored on the graphics accelerator; and calling a device driver in response to the page fault to switch the context stored on the graphics accelerator to that of the process attempting the access.

These and other objects and features of the invention will be better understood by reference to the detailed description which follows taken together with the drawings in which like elements are referred to by like designations throughout the several views.

BRIEF DESCRIPTION OF THE DRAWINGS

FIGS. 3a, 3b and 3c are a flow chart illustrating a method in accordance with the present invention.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

Although the present invention may be applied to any of a number of computer systems running different computer operating systems, for ease of understanding this explanation is explained in the context of the Unix operating system. Furthermore, the arrangement described for controlling the display of a plurality of windows on the output display is explained in the context of the X Window system or some similar window management system.

As has been pointed out, the invention of the first above-mentioned .patent application was conceived, inter alia, in order to speed context switching between processes using a graphics accelerator so that graphics applications might have direct graphics access to windows in a display controlled by a window system program. That invention provides for automatic context switching and access synchronization without a system call whenever a program not presently utilizing the graphics accelerator attempts to access that piece of hardware. The program attempting the access may be one of the application programs attempting direct graphics access or it may be the window system program.

The program seeking hardware access first writes to a page of memory (called the lock page) shared between the two programs. This lock page is used to provide exclusive access to a program during its use of the hardware or of a shared memory area. If the program is an application program, this exclusive use will terminate after a timed period; and the device will be released if the application program does not explicitly release the device before the end of that period. If the device (graphics accelerator) is not currently locked by another program, this program commences execution immediately. If the device is currently locked by another program, this attempt to write to the shared memory lock page causes a page fault. The virtual memory management software in the operating system recognizes this page of memory as a special page and calls the device driver to deal with the page fault. The device driver then causes the locked out program to sleep until the program which currently has locked the device explicitly relinquishes it or its time for use runs out. If the program is the window system program, the lock will not be relinquished until the program assures that any status information about the window recorded in the shared memory page (such as its position, size, and clip shape) is up to date.

Once an application program successfully locks the shared memory file, it can assume that any status information it needs is up to date and that it has the right to use the graphics hardware. If the program with the new lock was not the last program to use the graphics hardware, its first access to the hardware causes another page fault resulting in another call to the device driver which then loads the graphics hardware with the context that the program expects to find, allowing the program to believe it has exclusive use of the hardware. The program then proceeds until it is done with the graphics hardware whereupon it unlocks the shared memory page through an operation similar to the lock operation.

The device driver is part of the operating system but registers itself with the virtual memory management system so that it is called when certain types of operations (e.g., pixel access synchronization or context switching of the device) occur. Thus, the device driver is used to short circuit the requirement for system calls by the application program or the window system program and thus speed the context switching operation whenever access synchronization or a context switch is necessary for shared memory or a device. In one of the preferred embodiments disclosed in the aforementioned patent application, the invention functions to actuate the context switch only when the program actually has need of the graphics accelerator thereby substantially speeding the operation of the computer system. That invention gives the application program access to the pixels on the visual display by allowing the extremely rapid context switching necessary for both the window system program and the application program to access the graphics accelerator.

Figure 1:
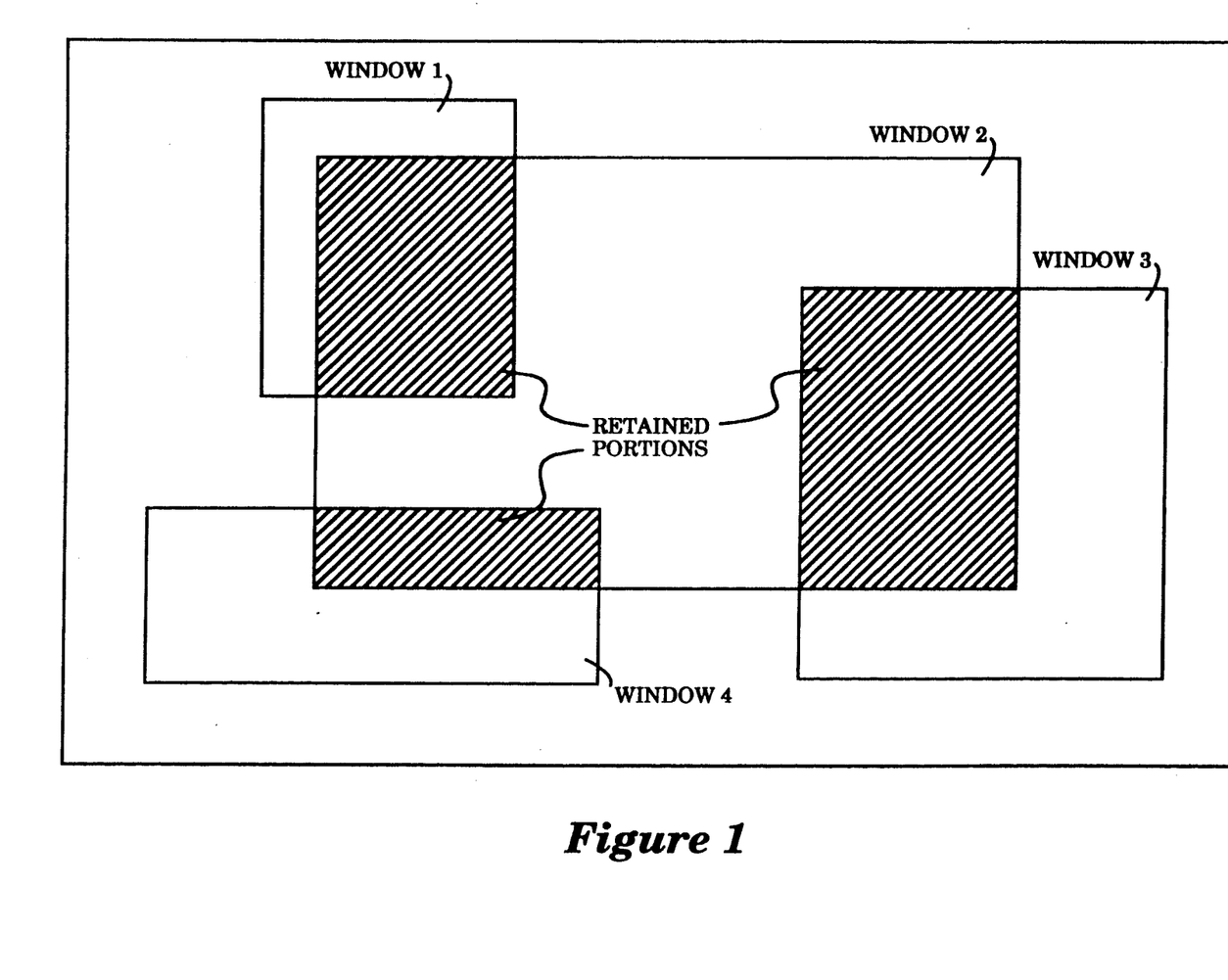
FIG. 1 is an illustration of an output display screen showing a number of overlapping windows.

As pointed out above, in the Unix operating system, an application program is typically running as one of a plurality of programs being operated simultaneously and having its results displayed simultaneously in a window on an output display. An output display presenting a number of application programs in a number of windows is illustrated in FIG. 1. When a portion of one of those windows is covered, it is desirable that the data in the covered portion be retained in backup storage space so that it may be redisplayed if the covering window is removed. The window system is typically set up to accomplish this operation. For this reason among others, many application programs request the window system program to create a retained window. However, although the above-mentioned invention can be used by an application program to access the visible portion of the window, the window system is the only program able to access the data in the retained window portion of memory using the invention. Thus, when utilizing the window system, an application program does not have access to the retained portion of the window area even though it does have direct graphics access to the visible portion of windows which are displayed. Consequently, while an application program with direct graphics access permission can make rapid updates to the pixels in the visible portion of its window, it must rely on the window system program to update the pixels in any covered portion of the window.

The present invention allows an application program to have direct graphics access to the retained portion of the window space both when the data is in off-screen frame buffer memory and when it is in system memory.

Figure 2:
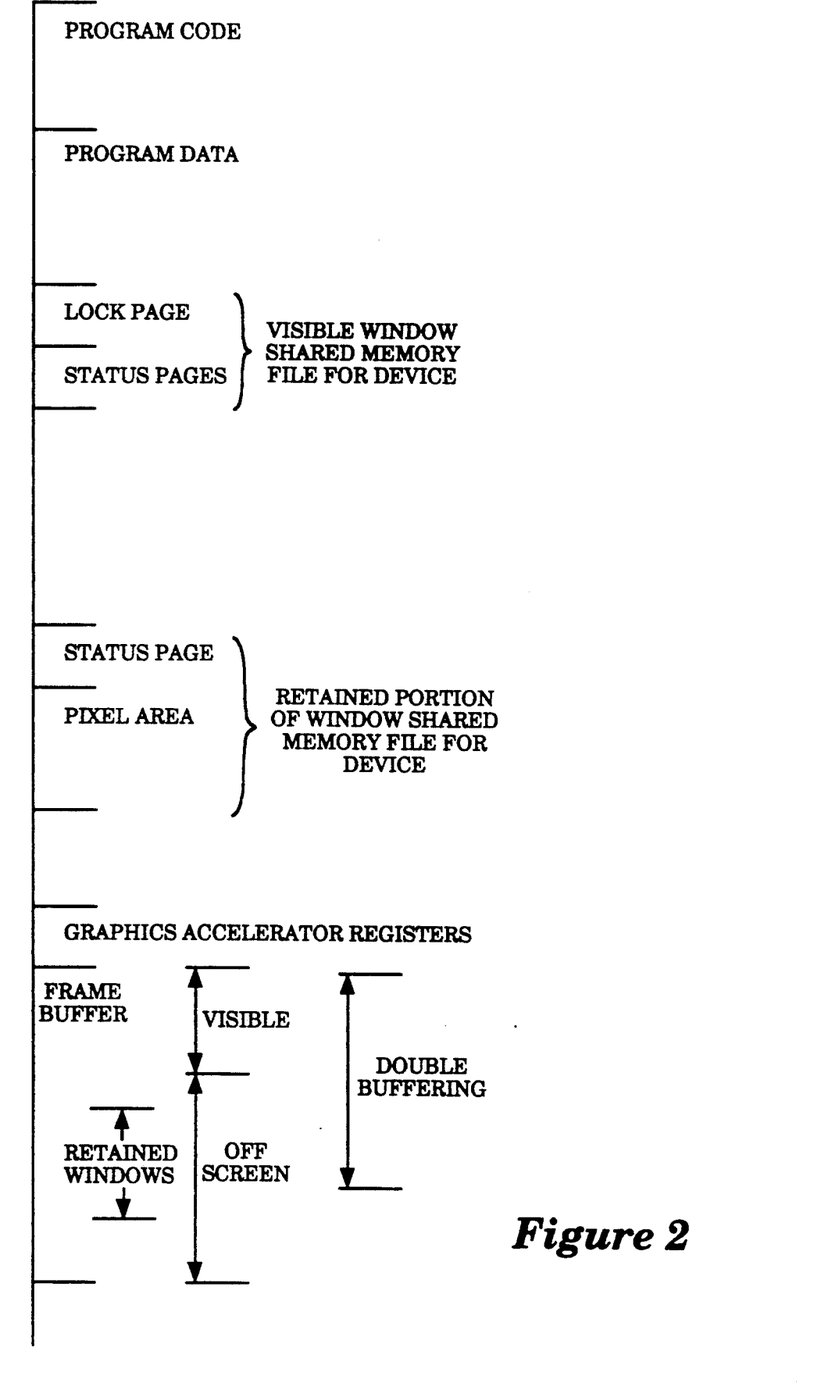
FIG. 2 is a virtual address map for an application program having direct graphics access.

When an application program starts, the operating system typically allocates a particular amount of virtual memory address space to the program. This virtual memory space is illustrated in FIG. 2. In general, the application program occupies only a small fraction of the virtual address space available to it with program instruction code and program data. When an application program desires to use a particular hardware device, it does so by asking the operating system to open a special file in the file system which corresponds to the particular device to be used. If the device is attached to the system and available to that program, the operating system returns a file descriptor to the application program providing an identifier for that device. The program then uses the descriptor to reference the device and asks the operating system to allocate some of the unused virtual memory address space remaining for the application program and to map the registers and memory associated with the particular hardware device into that virtual memory address space. This provides a set of virtual addresses by which the application program may address the hardware device.

In a similar manner, when the window system wants to use a graphics accelerator (a hardware device), it asks the operating system to open a special file which allows it to use the device, receives the device descriptor from the operating system, and has a portion of its virtual memory space set aside for register and memory addresses in the graphics accelerator. This provides a second set of virtual addresses by which the window system may address the graphics accelerator.

When the window system is used alone to control the output display without any direct graphics access to the graphics accelerator by the application programs, only the window system program has access to the graphics accelerator through this mapping of the graphics accelerator to the virtual memory space allocated to the window system. Each of the application programs then provides its data to the window system which typically places that data in system memory until it is ready to transfer it to the particular window allotted. In this type of operation, no context switching is required for a program to display data in a window of the output display since only the window system has access to the graphics accelerator and frame buffer memory.

However, when an application program (typically a graphics program) desires to access the graphics accelerator directly and also to utilize the window system to establish and move windows about as well as manipulate retained window data for those windows, then both the application program and the window system must have access to the device; and frequent synchronization and context switching is required. This requires that two different programs using different virtual addresses have access to the same physical addresses for the registers of the graphics display. It also requires that the window system which is managing the size, position, and overlapping of windows be able to communicate changes in this information in a timely manner to the application program using direct graphics access. In order to accomplish this, the two programs must somehow communicate with one another so that they do not interfere with one another. This has been accomplished through the use of a shared area of memory which both programs can access.

When an application program begins which desires to have direct graphics access to a visible window, the program signals the window system that it wants to create a window to which it has direct access and that the window is to be shared. The window system then creates a shared memory file in system memory, and both programs open and memory map that file into their respective virtual memory address spaces. This shared memory file is then used as both a synchronization mechanism and a method of communicating timely information from the window system to the application program and only for these purposes. The shared memory file includes a lock page and at least one status page. The status page contains a common data structure which both the application program and the window system understand. The data structure has various flags and information to indicate the status of the window. For example, the data structure tells where the window is located in frame buffer memory by its coordinates and which program presently has control of the window. Each program also separately maps the frame buffer into its respective virtual memory address space as is illustrated in FIG. 2 so that for operations which cannot be accomplished using the registers of the graphics accelerator, access to the frame buffer memory may be attained directly.

One of the advantages offered by the use of some window systems is the retained window feature. The retained portion of a window includes a copy of the data in any covered portion of the visible window. The retained portion of the window is typically stored in system memory. If the visible window is covered by a second window on the display as is illustrated in FIG. 1, the retained portion of the window is used to keep a copy of the last data sent to the covered portion so that the window may be restored if it is uncovered. In prior art window systems which function in the manner described, only the window system program had access to this retained window data. Consequently, if data was furnished for the covered portion of the visible window through direct graphics access by the application program, the data would be lost since the application program did not have access to the retained portion of the window. The window system program did not know that an update in the covered portion of the window was necessary since the application program was in charge of window updates; as a result, the window would display stale data when it was uncovered. Since only very fast graphics programs typically utilize the direct graphics access feature, these programs would often display distorted windows whenever they were uncovered until the particular application program gained control of the processor and could write new data to the now visible portion of the window.

The new method discussed above which has been developed for utilizing excess frame buffer memory to store off-screen data associated with the display provides a great deal of memory in which retained portions of windows may be very conveniently located. For example, display systems which provide double buffering for application programs offer substantial amounts of unused frame buffer memory during periods in which double buffering is not used. If this memory can be used for retained window support and similar display associated data, then the speed of graphics operations can be substantially enhanced. Since this information can be stored locally in the display hardware, the substantial time usually required to store and update the information in system memory is saved. However, it would be even more desirable if the retained portion of a window could be accessed directly by the application programs so that the problem of stale data would not occur when windows and similar portions of the display are uncovered.

Figure 3A:
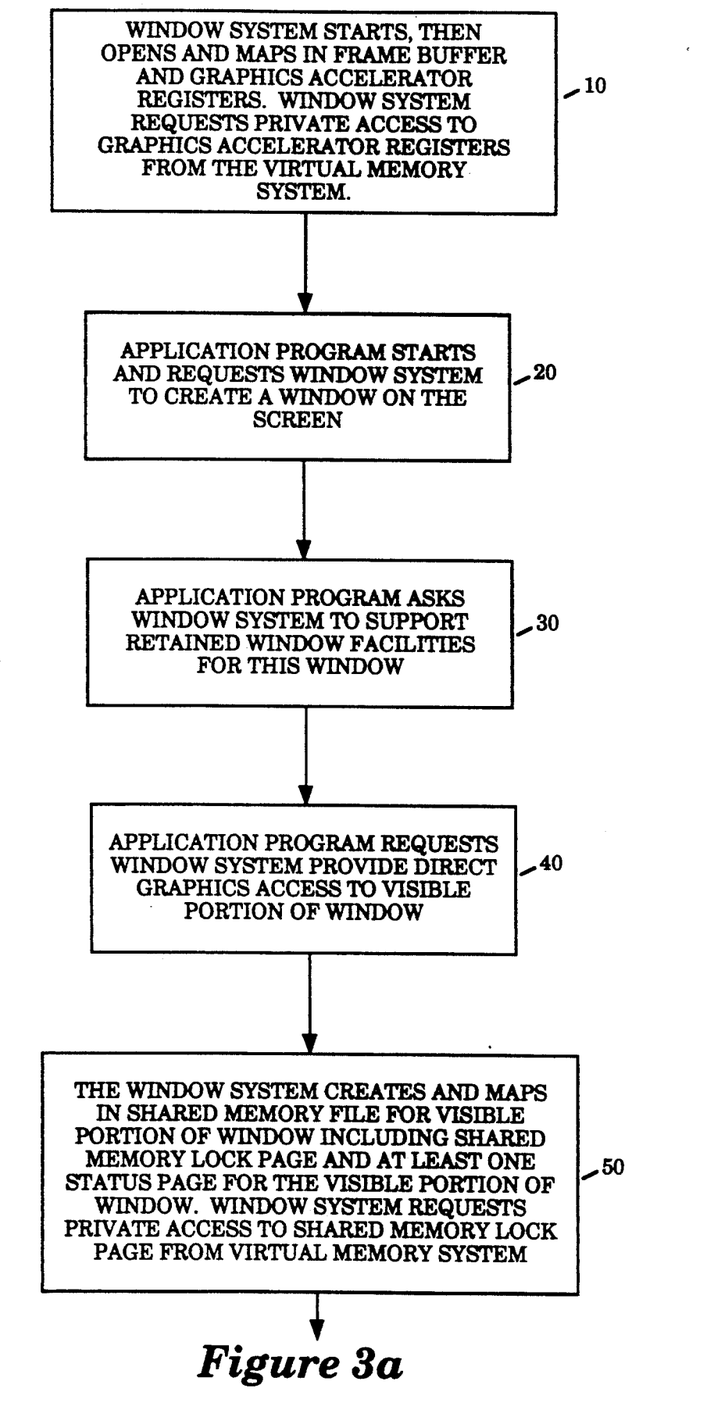
Figure 3B:
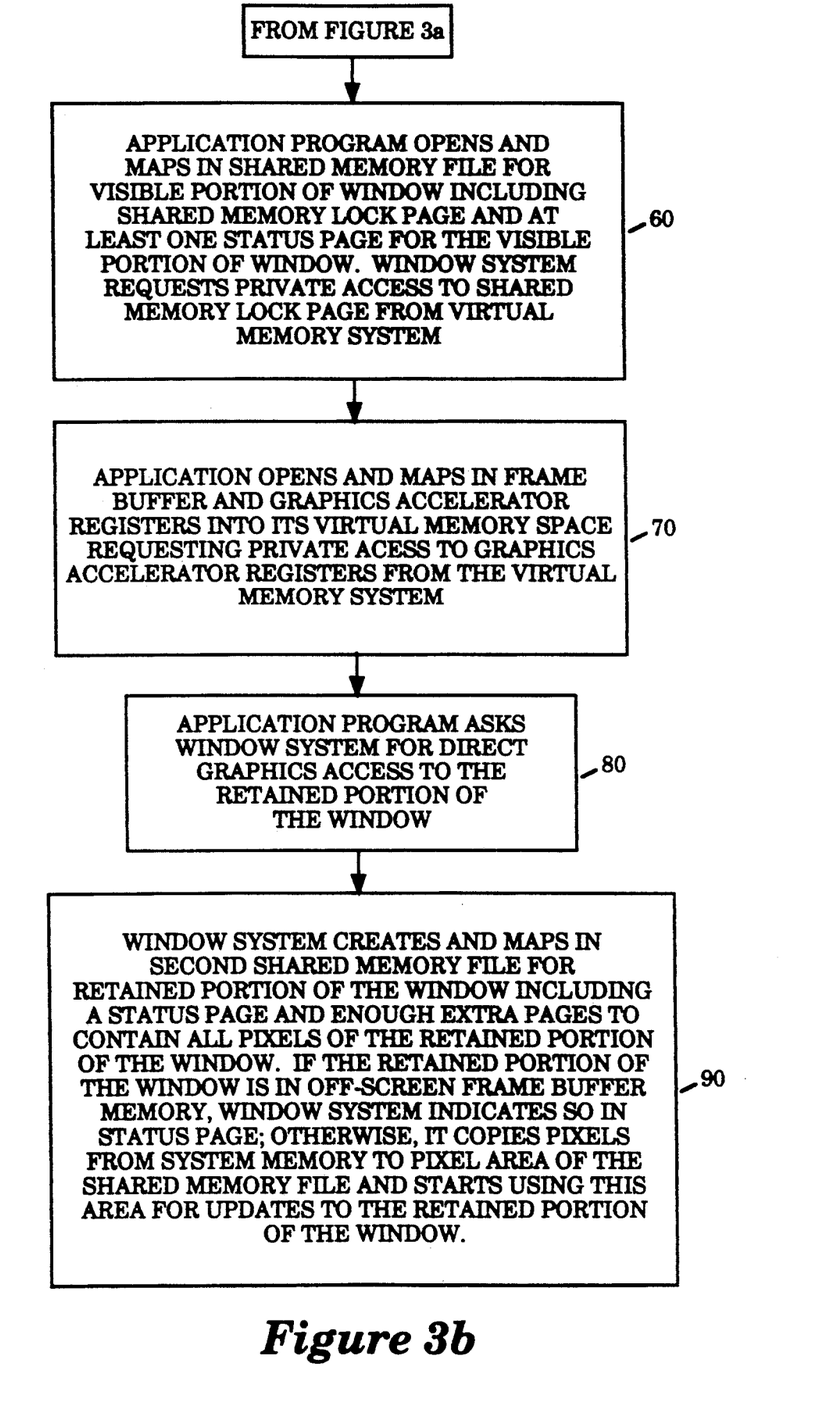

In order to accomplish this, the present invention expands the use of the rapid access synchronization and context switching of devices which obviates the need for system calls by the application programs, provides direct access to the retained portion of a window through the use of a second shared memory arrangement, extends the direct access to both the excess frame buffer memory and to system memory in which a retained window may be stored, and extends the use of the lock arrangement for accomplishing synchronization and communication between programs so that they do not interfere with one another. The steps of the method of the invention are detailed in FIG. 3.

The first step of the method is actually background to the operation of the window system. In this step 10, window system program begins operation. It receives virtual memory space and opens and maps the frame buffer and graphics accelerator registers to that space.

When an application program desires to have direct access to both the visible window and the retained window space which contains a copy of the data covered in the visible window, it signals the window system that it wants to create a window which is to be shared (step 20) and that it wants to utilize the retained window facility of the window system (step 30). Next the application program requests that it have direct access to the visible portion of this window (step 40). This requires the approval of the window system. Presuming this approval is given, the response of the window system and the interactions between the window system and the application program continue as illustrated in steps 50, 60, and 70 in the manner previously discussed with regard to the visible portion of the window. However, the interaction is extended by this invention to include the retained portion of the window.

The application program then signals the window system program that it wants access to the retained window space (step 80). If the window system grants the request for a shared retained window with direct graphics access, then the window system moves to step 90 to create an additional shared memory file for the synchronization information regarding the retained portion of the window and initializes the first page of the shared memory file as the status page for this file.

The window system provides a window identifier when it creates any window and this identifier is used in the shared memory file name for the retained portion of the window to provide a unique file name in the file system known to both the window system and the application program. The window system then (still step 90) extends the file size of this additional shared memory file to be large enough to contain all the pixels in the retained portion of the window and maps all this memory into its virtual memory address space.

In accomplishing step 90, the window system automatically attempts first to assign off-screen frame buffer memory if that memory is available for use by retained window data. If this is not possible, the window system places retained window data in system memory. If the retained portion of the window is in system memory, the pixels are copied to the pixel area of the shared memory file. The window system indicates to the application program whether the retained portion of the window is in off-screen frame buffer memory or in the pixel area of the shared memory file by information in the status page of the shared memory file. Once a retained portion of a window has been placed in off-screen frame buffer memory controlled by the graphics accelerator, the pixel data remains in the same place unless it is moved to the pixel area of the retained window shared memory file by the window system. If this occurs and the pixel data is later put back into off-screen memory in another position, the application program notices the new position when it next accesses the shared memory file status page which has been updated by the window system.

The application program also maps the additional shared memory file at step 100 to its virtual memory space (see FIG. 2). When the application program requests the window system to create a window, the window system returns the window identifier to the application program. The application program then uses this window identifier for all further communications involving this window. Since both the application program and the window system know about this unique identifier and how to construct the file name for the retained window shared memory file from this identifier, the application program automatically knows that file to open and map into its virtual memory address space to gain access to the retained portion of the window. It finds the shared memory file for the visible portion of the window in a similar manner.

As pointed out, the first page of this second shared memory file includes a data structure with which both the application program and the window system can communicate regarding the retained portion of the window. The data structure has various flags to indicate the status of the shared information. For example, the data structure tells whether the file is in frame buffer off-screen memory or in the pixel area of the shared memory file in system memory. It also specifically tells where the retained portion of the window is located by its coordinates if it is in the excess frame buffer memory and which frame buffer it is located in if more than one frame buffer is active. This window location information may be used by the application program if it needs to directly access the frame buffer memory for operations which are not available through the registers of the graphics accelerator.

Because it has direct access to both the pixels and the shared memory files which constitute the status of the visible and the retained window space, when the application program updates the contents of the visible portion of the window, it can simultaneously update any necessary area in the retained portion of the window. Then, if an overlapped portion of the window should later be uncovered, the data in the newly uncovered portion will not be stale when copied to the screen by the window system.

Once both the window system and an application program seeking to use direct graphics access on both the visible and the retained portions of a window have established the appropriate shared memory communication areas, their synchronization interactions proceed in the following manner.

Both the window system and the application program have requested that the virtual memory system grant private access to the shared memory lock page for the visible portion of the window (steps 50 and 80). Both programs follow the convention that before either one alters any status information in the shared memory status pages or accesses the pixel area of either the visible or retained portions of the window, they first "lock" these shared areas by attempting an access to the shared memory lock page (step 110 or step 130). This access, if effective, causes the virtual memory system to treat the program making the access as the temporary owner of all these memory areas. An attempted access to the lock page when neither program has the lock provides immediate granting of the lock to that program by the virtual memory system. The process continues on, making any status or pixel alterations necessary, and then unlocks the lock page using an access similar to the locking operation. If, however, one program has the lock page locked and the other program attempts to access the lock page, this program is blocked by the virtual memory system page fault mechanism and is put to sleep by the driver until the lock page is unlocked. The window system has some special privileges in that it may keep the lock for as long as it wants, but an application program that keeps the lock for too long will time out, and the device driver will interrupt and take the lock away from it.

Whenever the window system needs to update shared memory status information, it waits for all application programs with direct graphics access to give up their locks, preventing the granting of any new locks while it is waiting, then it locks all affected windows, makes its updates which may include moving pixels from off-screen memory to the shared pixel area, then releases all locks.

Thus, since it is a requirement for a direct graphics access application program to obtain the lock before accessing either shared memory status or pixel information, it is impossible for the application program to encounter either status or pixel information in a transitional state. The application program can be assured that once it obtains the lock, it can and should update both the visible and the retained pixel areas for a window before releasing the lock.

Thus, the window system uses lock pages to assure that all application programs are locked out from direct graphics access anytime it needs to update the status information in the shared memory status pages. In a similar manner, when an application wants to update the contents of its window using direct graphics access (step 130), it first writes to the shared memory lock page for the visible portion of the window using the method previously discussed. Once it has obtained access and locked the shared memory lock page, it can assume that all the status information for both the visible and retained portions of the window in the shared memory is complete and accurate. The application program can then use this information to determine how to update the contents of both the visible and retained portions of the window and does so before giving up the lock. Once again, an attempt to access the graphics device when the state of another program is stored on the graphics accelerator generates a page fault and brings the device driver into operation to accomplish the context switching.

As pointed out above, although the driver for a device is part of the operating system, it registers itself with the virtual memory management system so that it is called when context switching of the device is to occur due to an attempted access (step 120 or step 140). Thus, the driver is used to short circuit the requirement for system calls by the application program whenever a context switch is necessary for a device. This allows the switching to occur very rapidly at a speed which can keep up with the transfer of high speed graphics operations.

Typically, the window system is not required to do very much with the shared retained window status area once the window has been set up (step 110). Usually, it only changes status information on a window resize, or when double buffering requires the area of the frame buffer being used by the retained portion of the window and the stored pixel data needs to be moved to the pixel memory area of the shared memory file. When the latter occurs, the window system obtains access to the shared memory file for the retained portion of the window by locking out the application program. This is accomplished by issuing an "all lock" command to all of the shared memory files for all application programs with direct graphics access privileges. The all lock command locks those shared memory files which are unlocked, waits for the time out period on any files in use, and then preempts and locks those shared memory files if preemption becomes necessary. Once it has the lock on a shared memory file, the window system changes the designation in the data structure to indicate that the pixel data is in the pixel area of the shared memory file so that the application program will be able to find the pixels for the retained portion of the window and access them when the data has been moved. Finally, the window system moves the data from the frame buffer excess memory space to the pixel area of the shared memory file which begins on the first byte of the second page of the file.

When the application program next gains access to the shared memory file (step 130) to write to the retained window memory area, it finds the information in the status page which indicates that the file is in the pixel memory area of the shared memory file in system memory. If the window is resized, the window system sets an obsolete flag in the status page of the shared memory file, checks to make sure that the name of the file has been removed from the file system, recreates a file with the same name but of a size appropriate for the new window size, and reinitializes this file. The next time the application attempts to access the old shared memory area, it sees the obsolete flag and knows to close the old file and try to reopen and remap the new file.

Although the present invention has been described in terms of a preferred embodiment, it will be appreciated that various modifications and alterations might be made by those skilled in the art without departing from the spirit and scope of the invention. For example, the invention might be used not only for what is typically described as retained windows but for multiple off-screen buffers in the case of an application program using the multibuffering support provided by the window system. The invention should therefore be measured in terms of the claims which follow.

What is claimed is:

1. A method for allowing a first process to have direct graphics access to backup storage areas in a frame buffer memory used for retained windows, said backup storage areas controlled by a graphics accelerator, said graphics accelerator storing at least two state, said method comprising the steps of:

establishing a shared memory file in a system memory for the backup storage area indicating that the retained windows area initially exists in excess frame buffer memory, the shared memory file having storage to indicate use of the shared area by the first process;

generating a page fault whenever an access to the graphics accelerator is attempted by the first process and a state corresponding to a second process is stored on the graphics accelerator; and calling a device driver in response to the page fault to switch the state stored on the graphics accelerator to a state corresponding to the first process attempting the access to the graphics accelerator.

2. A method for allowing a first process to have direct graphics access to backup storage areas in a frame buffer memory used for retained windows and controlled by a graphics accelerator, said graphics accelerator storing at least two states, said method comprising the steps of:

establishing a first shared memory file in a system memory for a window which is to have a retained portion, providing means in the first shared memory file for precluding a program from using the window when another program is using the window;

opening a second shared memory file in the system memory for a retained portion of the window, the second shared memory file being responsive to the means in the first shared portion for precluding a program from using the window when another program is using the window, providing means in the second shared memory file to indicate that the retained windows area initially exists in excess frame buffer memory, the second shared memory file having storage to indicate the use of the shared area by a process;

generating a page fault whenever an access to the graphics accelerator is attempted by the first process and a state corresponding to a second process is stored on the graphics accelerator; and calling a device driver in response to the page fault to switch the state stored on the first graphics accelerator to a state corresponding to the process attempting the access once the graphics accelerator becomes free.

3. A system for allowing a first process to have direct graphics access to back up storage area in a frame buffer used for retained windows and controlled by a graphics accelerator which comprises:

means for establishing a shared memory file in system memory for a visible portion of a window which is to have a retained portion;

means in the first shared memory file for precluding a first program from using the window when a program other than said first program is using the window;

means for establishing a second shared memory file in an excess frame buffer memory or a system memory for a retained portion of the window, the second shared memory file being responsive to the means in the first shared memory file for precluding a first program from using the window when a program other than said first program is using the window;

means in the second shared memory file for indicating whether the retained windows area exists in the excess frame buffer memory or the system memory;

means for mapping the first shared memory file and the second shared memory file to a virtual address space associated with each program having access to the graphics accelerator;

means for generating a page fault whenever an access to the graphics accelerator is attempted by the first process and a state corresponding to a second process is stored on the graphics accelerator; and means for responding to the page fault created when a state corresponding to the second process is stored on the graphics accelerator to switch the state stored on the graphics accelerator to a state corresponding to the first process attempting the access once the graphics accelerator becomes free.

4. A method for allowing a first process to have direct graphics access to backup storage areas in a frame buffer memory used for retained windows and controlled by a graphics accelerator as claimed in claim 3 in which the means for generating a page fault whenever an access to the graphics accelerator is attempted by the first process and a state corresponding to the second process is stored on the graphics accelerator includes means for locking the first and second shared memory files.

5. A method for allowing a first process to have direct graphics access to backup storage areas in a frame buffer memory used for retained windows and controlled by a graphics accelerator as claimed in claim 3 in which the means for responding to the page fault created when a state corresponding to the second process is stored on the graphics accelerator to switch the state stored on the graphics accelerator to a state corresponding to the first process attempting the access once the graphics accelerator becomes free comprises means for calling a device driver for the graphics accelerator to switch the state of the graphics accelerator.

6. A system for allowing a first process to have direct graphics access to backup storage areas in a frame buffer memory used for retained windows and controlled by a graphics accelerator as claimed in claim 3 in which the first shared memory file in system memory for a visible portion of a window which is to have a retained portion includes means for describing the visible portion of the window, and in which the second shared memory file in system memory for a retained portion of the window includes means for describing the retained portion of the window.

7. A system for allowing a first process to have direct graphics access to backup storage areas in a frame buffer memory used for retained windows and controlled by a graphics accelerator as claimed in claim 3 in which the means for establishing a second shared memory file in an excess frame buffer memory or a system memory for a retained portion of the window includes means for storing a plurality of pixels associated with the retained portion of a window.

8. A system for allowing a first process to have direct graphics access to backup storage areas in a frame buffer memory used for retained windows and controlled by a graphics accelerator as claimed in claim 3 in which the means for mapping the first shared memory file and the second shared memory file to a virtual address space associated with each program having access to the graphics accelerator comprises a memory management unit.

* * * * *

UNITED STATES PATENT AND TRADEMARK OFFICE
CERTIFICATE OF CORRECTION

PATENT NO. : 5,245,702
DATED : September 14, 1993
INVENTOR(S) : McIntyre et al.

It is certified that error appears in the above-identified patent and that said Letters Patent is hereby corrected as shown below:

In column 14, claim 1 at line 14, please delete " state " and insert -- states --.

In column 14, claim 3 at line 63, please delete " back up storage area " and insert -- backup storage areas --.

In column 14, claim 3 at line 66, please delete " a shared " and insert -- a first shared --.

In column 15, claim 4 at line 33, please delete " method " and insert -- system --.

In column 16, claim 5 at line 1, please delete " method " and insert -- system --.

Signed and Sealed this

Twenty-first Day of October 1997

Attest:

Attesting Officer

BRUCE LEHMAN

Commissioner of Patents and Trademarks